UNITED STATES PATENT OFFICE.

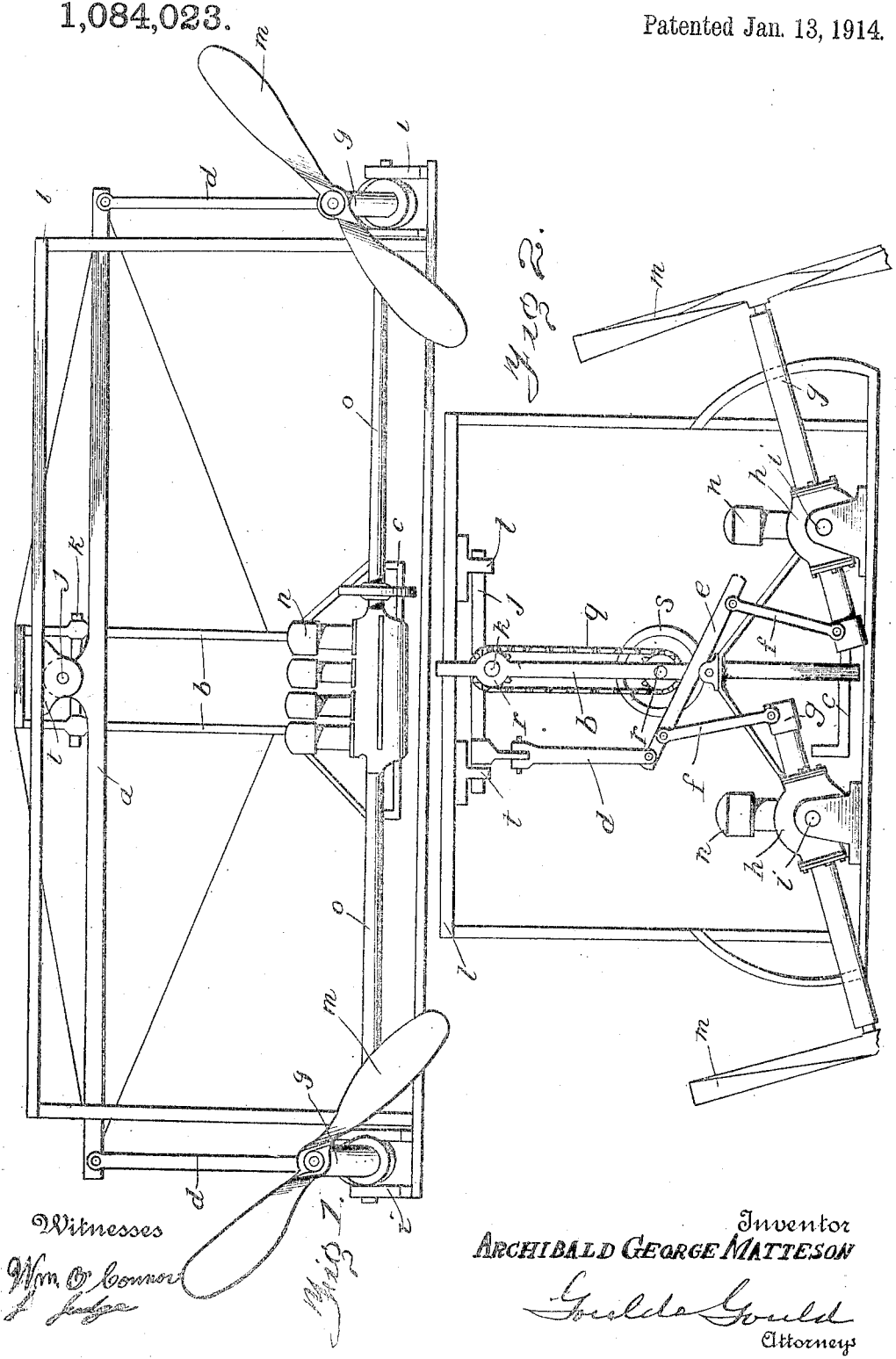

ARCHIBALD GEORGE MATTESON, OF VENTURA, CALIFORNIA.

AUTOMATIC BALANCING DEVICE FOR FLYING-MACHINES.

1,084,023.

Specification of Letters Patent. Patented Jan. 13, 1914.

Application filed August 23, 1911. Serial No. 645,647.

*To all whom it may concern:*

Be it known that I, ARCHIBALD GEORGE MATTESON, a citizen of the United States, residing at Ventura, in the county of Ventura and State of California, have invented a new and useful Improvement in Automatic Balancing Devices for Flying-Machines, of which the following is a specification.

My invention relates to a combination of mechanical principles whereby perfect equilibrium or balance is permanently maintained by the propelling force which is automatically and mechanically controlled; and the object of my invention is, first to provide a system of maintaining equilibrium or balance by mechanical means which operates automatically; second, to afford facilities for a continuous flight and operation of the machine by the use of one or more power plants or engines, driving separate sets of propellers, working independently of each other; either separate and independent set of which is capable of maintaining automatic, mechanical equilibrium or balance and continuous operation and flight of the machine, to the exclusion or stopping of one set of propellers and their driving power; third, my object is to reduce the necessary functions of the driver or aviator, concerning the maintenance of equilibrium or balance during flight to the smallest possible degree by utilizing the driver's weight, which is a permanent factor acted upon by gravity, to control the line of draft or pull of the propellers, of which there are two to each set located, one on each side of the machine (right and left of driver, facing ahead) on an angle either up or down, the automatic action forces this change of angle of both propeller shafts or line of pull simultaneously, one with the other with a positive degree of action, more or less as the case may be, depending entirely and exactly upon the existing tendency of flying machines to lose their equilibrium or balance, this change of angle is so accomplished by the automatic device that while one propeller shaft angle is increased the angle of the other or mate to this pair or set, is decreased. By this means the driving power or engine of the machine is utilized to accomplish the task of maintaining equilibrium or balance. I attain these objects by the mechanism illustrated in the accompanying drawing, in which—

Figure 1 is a front view of the machine. Fig. 2 is an end view of the machine.

Similar letters refer to similar parts throughout the several views.

Letter $l$ represents the frame member of a flying machine to which I secure bearing blocks $t$, which support my entire automatic balancing mechanism from the shaft $j$ which has secured to it the two vertical posts $b$ $b$ which carry a platform $c$ at the bottom, upon which the driver sits or rides. This platform is free to move or swing as a pendulum from side to side by turning its supporting shaft $j$ in its bearings $t$. This shaft also has secured to it the lever or member $a$ which projects to both ends of the machine and operates in conjunction with the driver's platform. The wires $p$ act as braces or trusses to brace and compel the lever $a$ to act positively with the pendulum action of the driver's platform or car. Connecting rods $d$ are attached to the ends of member $a$ which actuate lever $e$, to which are connected rods $f$, Fig. 2, which operate the propeller shaft housings $g$ either up or down. A bevel gearing in housing $h$ transmits the motive power from the motor shaft at right angles to propeller shafts. The bearings $i$ support the bevel gear housings $h$ and allow them freely to move. The shaft $k$ is revolved by the hand wheel $s$ which operates the sprocket wheels $r$ by the sprocket chain $q$. This action is for hand control of a balancing plane forming co-pending application, filed by me Sept. 12, 1912, Ser. No. 720,072.

The action of the machine is to counteract any difference of level by the power of the engines as when one end of the machine should be blown upward the pendulum action of the driver's weight would maintain a perpendicular position which would cause the propeller shaft angle on the high end of the machine to be decreased and the propeller shaft angle on the low end of the machine to be increased which brings the entire craft back to its correct position and as the machine gains its position the propeller shaft angles assume their correct positions with absolute precision without the least effort on the aviator's part.

I claim:

1. A lateral stability mechanism for aeroplanes including a pair of propellers arranged adjacent each side of the machine, each pair including a forward propeller and a rear propeller, of means relatively movable with respect to the aeroplane structure through the influence of gravity for inducing relatively vertical movement of all of said propellers, said means moving the respective propellers of each pair in opposition to each other, and the similar propellers of each pair in opposition to the lateral inclination of the aeroplane structure with regard to the driving power of such propellers, whereby the rear propellers of each pair are operated to force the aeroplane to a balanced position and the forward propellers operated to draw it to a balanced position.

2. The combination with a lateral stability mechanism including oppositely-arranged propellers capable of vertical movement independently of the aeroplane structure, of a lever pivotally mounted upon the aeroplane structure, links connecting the respective propeller shafts with the lever on opposite sides of the pivot, a driver's seat mounted for swinging movement, an arm connected to and operated in the movement of the seat, and a connection between said arm and lever, whereby in the movement of the seat the lever is actuated to reversely operate the propellers.

3. An aeroplane including oppositely arranged pairs of propellers, a lever pivotally mounted on the aeroplane adjacent each pair of propellers, links connecting each lever with the propellers of the adjacent pair, said links being arranged on opposite sides of the lever pivot, a driver's seat mounted for swinging movement, an arm centrally connected to the seat and having its free end movable in opposite directions under the influence of the seat movement, and links connecting the respective ends of the arm with the adjacent levers, whereby in the movement of the seat the respective propellers of each pair and the similar propellers of each pair are moved in opposition to each other.

ARCHIBALD GEORGE MATTESON.

Witnesses:
ROBERT M. CLARKE,
C. L. CHRISMAN.